United States Patent
Huang

(10) Patent No.: US 8,314,629 B2
(45) Date of Patent: Nov. 20, 2012

(54) SAS INTERFACE OUTPUT SIGNAL DETECTING APPARATUS

(75) Inventor: Fa-Sheng Huang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 243 days.

(21) Appl. No.: 12/791,878

(22) Filed: Jun. 2, 2010

(65) Prior Publication Data
US 2011/0291689 A1    Dec. 1, 2011

(30) Foreign Application Priority Data
May 19, 2010    (CN) .......................... 2010 1 0176405

(51) Int. Cl.
*G01R 31/00*    (2006.01)
*G01R 31/26*    (2006.01)
(52) U.S. Cl. .......... 324/756.02; 324/756.07; 324/762.04
(58) Field of Classification Search ............. 324/756.04, 324/765.05–756.07, 762.01–762.1, 750.01–750.3; 439/581, 638, 502, 79, 541.5; 174/17.08, 174/359, 50–53, 145, 59; 361/785, 789
See application file for complete search history.

(56) References Cited

U.S. PATENT DOCUMENTS

| | | | |
|---|---|---|---|
| 7,273,391 B2* | 9/2007 | Purwin | 439/502 |
| 7,384,276 B2* | 6/2008 | Lee | 439/79 |
| 8,083,536 B2* | 12/2011 | Leach | 439/358 |

* cited by examiner

*Primary Examiner* — Tung X Nguyen
(74) *Attorney, Agent, or Firm* — Altis Law Group, Inc.

(57) ABSTRACT

A serial attached small computer system interface (SCSI) (SAS) interface output signal detecting apparatus includes an SAS female connector, an SAS male connector, and two subminiature version A (SMA) connectors. Each of the SAS female and male connectors includes first and second groups of data pins and a group of power pins. The power pins of the SAS female connector are connected to the power pins of the SAS male connector. The SMA connectors are connected to two data output pins of the second or first group of data pins of the SAS female connector in response to the first group of data pins of the SAS female connector being connected to the first group of data pins of the SAS male connector or the second group of data pins of the SAS female connector being connected to the second group of data pins of the SAS male connector.

4 Claims, 3 Drawing Sheets

SAS INTERFACE OUTPUT SIGNAL DETECTING APPARATUS

BACKGROUND

1. Technical Field

The present disclosure relates to signal detecting apparatuses, and particularly, to a signal detecting apparatus for detecting output signals from serial attached small computer system interface (SAS) interfaces of an electronic device.

2. Description of Related Art

Nowadays, SAS interfaces are used in many electronic devices, such as SAS hard disk drives (HDDs). A system, such as a data server, may use a number of SAS HDDs to save data. After manufacturing but before shipping, the system needs to be tested. One test is to detect output signals from the SAS interfaces of the SAS HDDs. A common method is to use a probe of an oscillograph to directly touch the signal output pins of the SAS interfaces. However, the test result of this common method may be inaccurate.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawing in which like references indicate similar elements, is illustrated by way of example and not by way of limitation. It should be noted that references to "an" or "one" embodiment in this disclosure are not necessarily to the same embodiment, and such references mean at least one.

Figure 1:
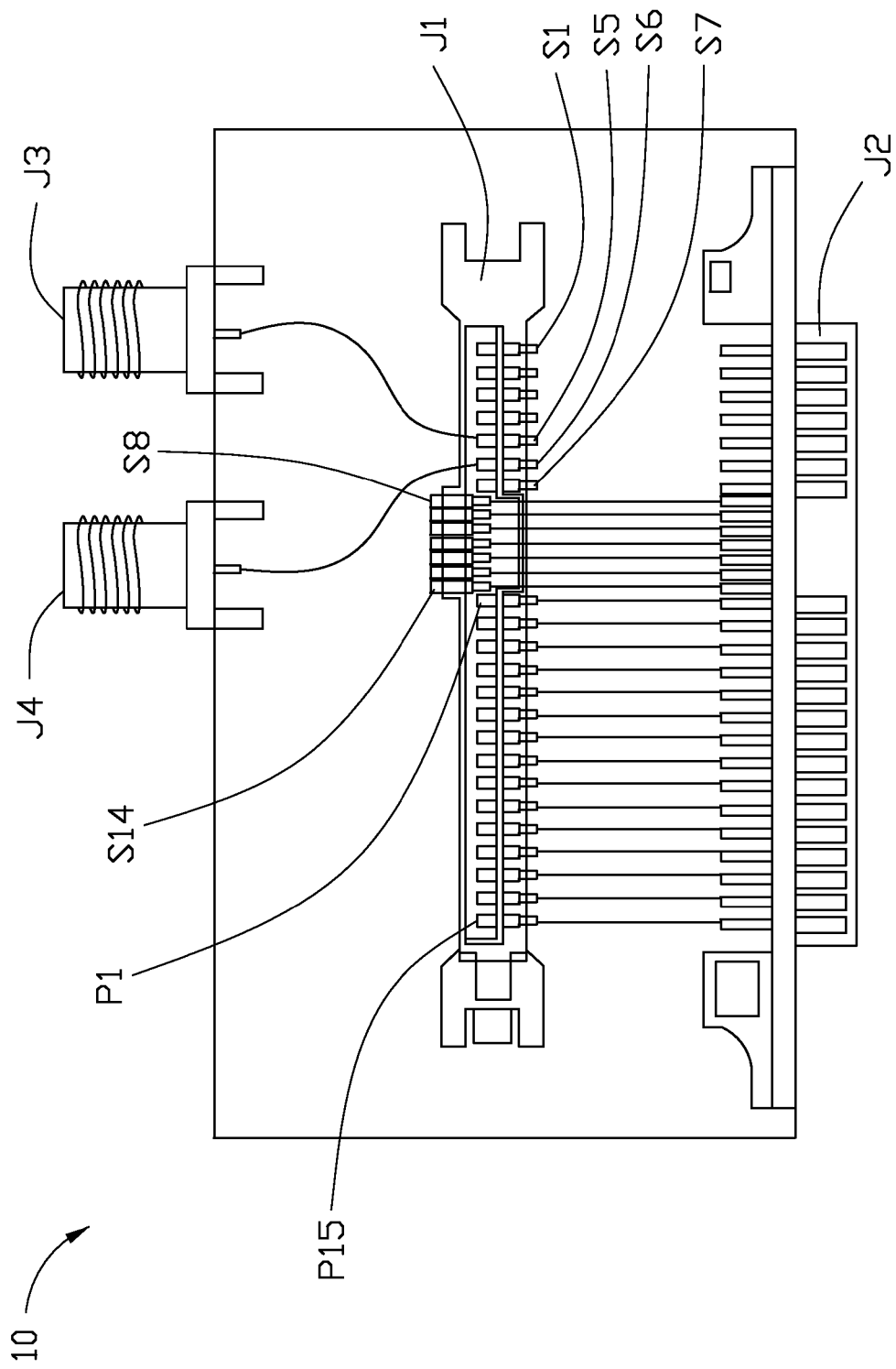
FIG. 1 is a schematic view of a first detecting board of an embodiment of a serial attached small computer system interface (SAS) interface output signal detecting apparatus.
Figure 2:
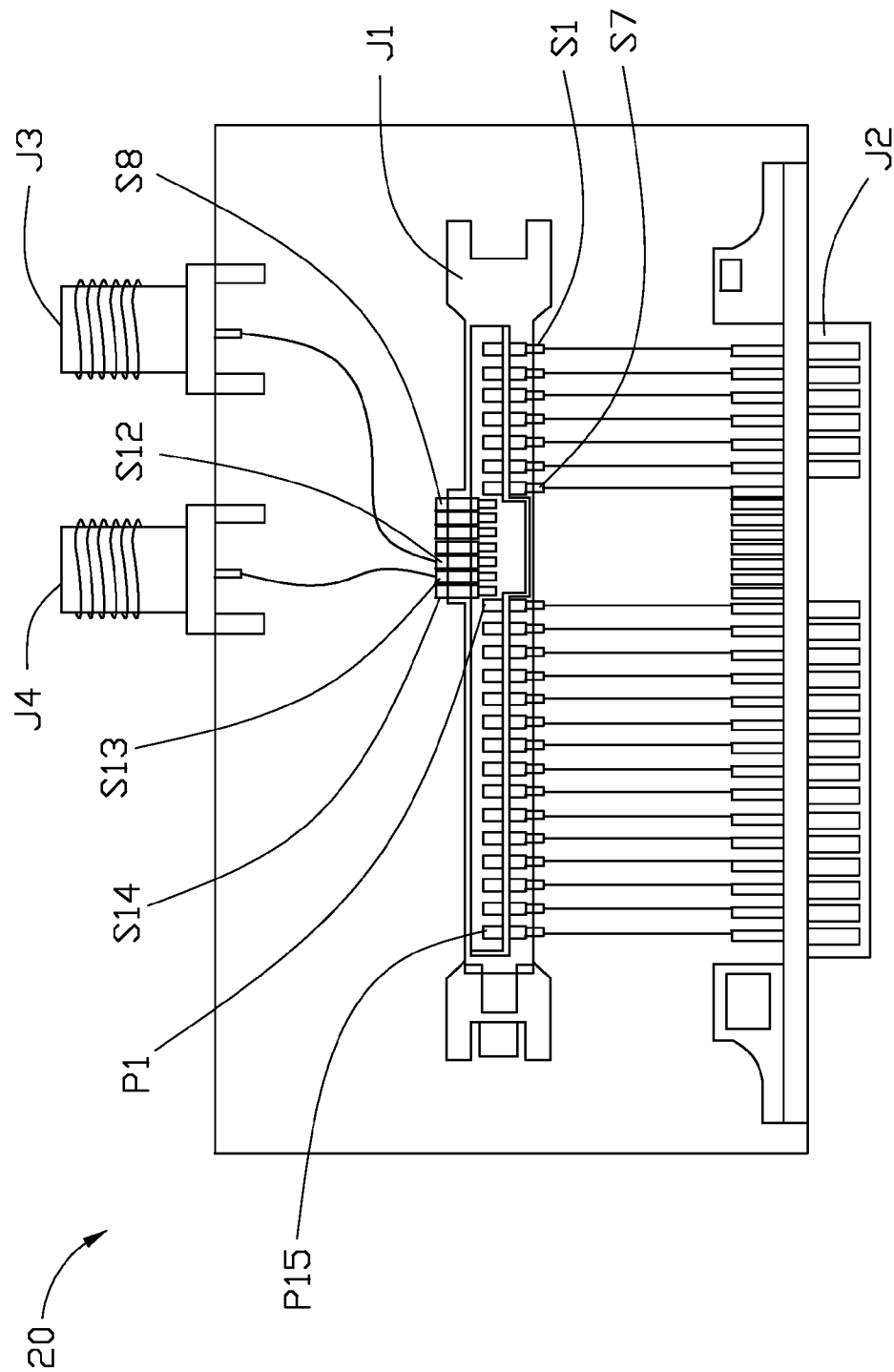
FIG. 2 is a schematic view of a second detecting board of the SAS interface output signal detecting apparatus of FIG. 1.

Referring to FIGS. 1 and 2, an embodiment of a serial attached small computer system interface (SAS) interface output signal detecting apparatus includes a first detecting board 10 and a second detecting board 20. The first and second detecting boards 10 and 20 each include an SAS female connector J1, an SAS male connector J2, and two subminiature version A (SMA) connectors J3 and J4.

The SAS female connector J1 and the SAS male connector J2 each include a first group of data pins S1-S7, a second group of data pins S8-S14, and a group of power pins P1-P15. In one embodiment, the impedance of each of the SMA connectors J3 and J4 is about 50 ohms.

In the first detecting board 10, the second group of data pins S8-S14 and the group power pins P1-P15 of the SAS female connector J1 are connected to the corresponding pins of the SAS male connector J2. Two data output pins S5 and S6 of the first group of data pins S1-S7 are respectively connected to the two SMA connectors J3 and J4.

In the second detecting board 20, the first group of data pins S1-S7 and the group power pins P1-P15 of the SAS female connector J1 are connected to the corresponding pins of the SAS male connector J2. Two data output pins S12 and S13 of the second group of data pins S8-S14 are respectively connected to the two SMA connectors J3 and J4.

Figure 3:
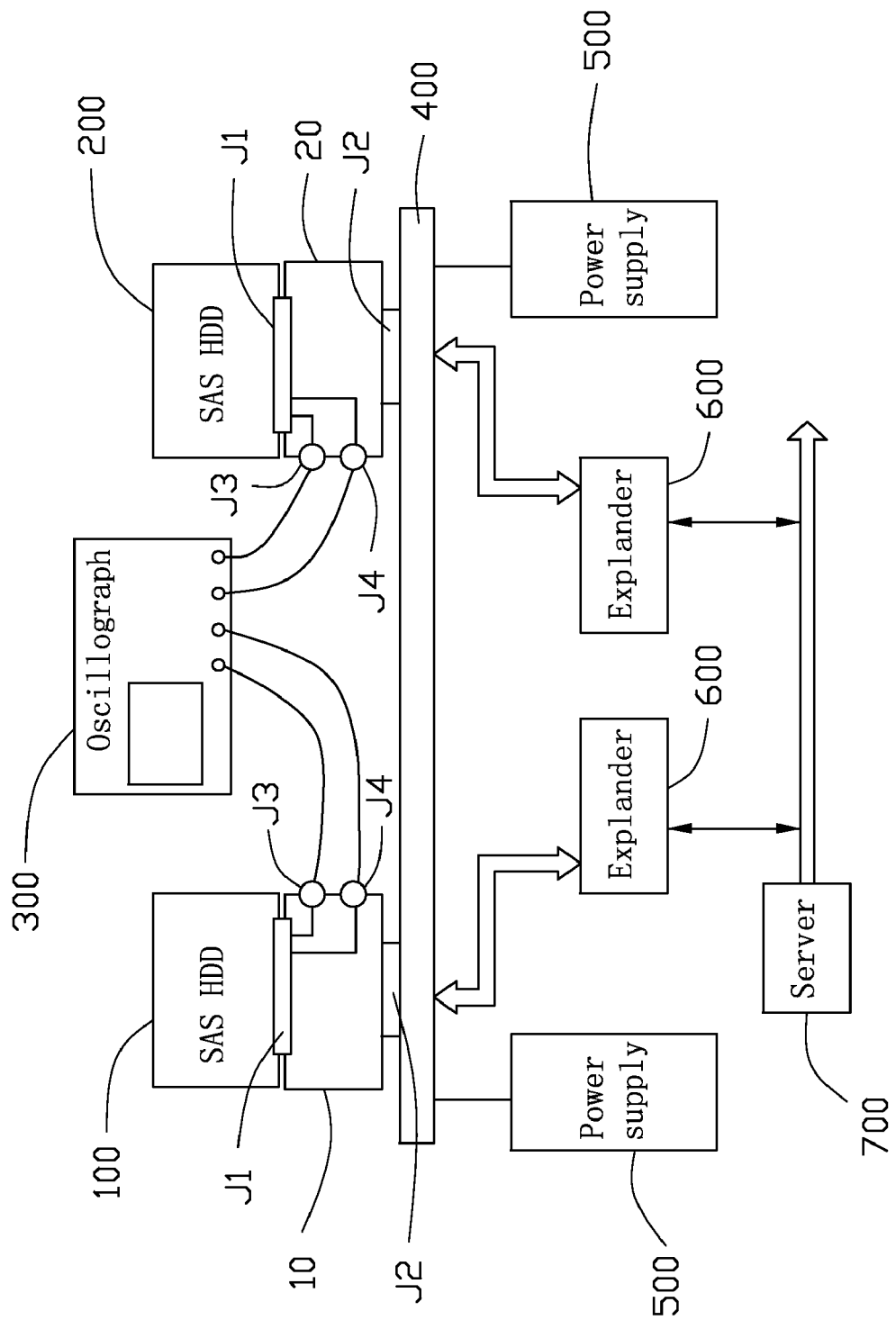
FIG. 3 is a schematic view of the SAS interface output signal detecting apparatus of FIGS. 1 and 2 detecting SAS interfaces of a system.

Referring to FIG. 3, to operate the apparatus to detect signals, two SAS hard disk drives (HDDs) 100 and 200 are respectively connected to the SAS female connectors J1 of the first and second detecting boards 10 and 20. The SAS male connectors J2 of the first and second detecting boards 10 and 20 are respectively connected to two SAS interfaces (not shown) of a backboard 400 of a system. The SMA connectors J3 and J4 of the first detecting board 10 are connected to a first pair of probes of an oscillograph 300. The SMA connectors J3 and J4 of the second detecting board 20 are connected to a second pair of probes of the oscillograph 300.

In the system, the backboard 400 is further connected to a plurality of power supplies 500, to supply power signals to the SAS HDDs 100 and 200. The backboard 400 is also connected to a server 700 by two expanders 600. The server 700 is used to output control signals to the SAS HDDs 100 and 200 via the two expanders 600, respectively. It may be understood that the system also includes other elements, such as central processing units, for example. These other elements fall within well-known technologies, and are therefore not described here.

To test the SAS HDD 100, the server 700 transmits control signals through the second group of data pins S8-S14 of the SAS female connector J1 to the SAS HDD 100. The SAS HDD 100 is set with some predetermined parameters, such as voltage range and detecting codes of the control signals from the server 700. The data output pins S6 and S7 of the first group of data pins S1-S7 of the SAS female connector J1 then receive corresponding output signals from the SAS HDD 100 to the oscillograph 300 via the two SMA connectors J3 and J4. Because the received signals from the SAS HDD 100 are already set by the server 700 according to requirements and the SMA connectors J3 and J4 satisfy impedance requirements, the detecting result read from the oscillograph 300 is accurate.

To test the SAS HDD 200, the server 700 transmits control signals through the first group of data pins S1-S7 of the SAS female connector J1 to the SAS HDD 200. The SAS HDD 200 is set with some predetermined parameters, such as voltage range, detecting codes by the control signals from the server 700. The data output pins S12 and S13 of the second group of data pins S8-S14 of the SAS female connector J1 then receive corresponding output signals from the SAS HDD 200 to the oscillograph 300 via the two SMA connectors J3 and J4. Because the received signals from the SAS HDD 200 are already set by server 700 according to requirements and the SMA connectors J3 and J4 satisfy impedance requirements, the detecting result read from the oscillograph 300 is accurate.

In other embodiments, the SAS interface output signal detecting apparatus can only use one detecting board to replace the first detecting board 10 and the second detecting board 20 in different using states. The one detecting board also has some elements of the first detecting board 10 and the second detecting board 20. In other word, when the one detecting board replaces the first detecting board 10, the first group of data pins S1-S7 and the group power pins P1-P15 of the SAS female connector J1 are connected to the corresponding pins of the SAS male connector J2. Two data output pins S12 and S13 of the second group of data pins S8-S14 are respectively connected to the two SMA connectors J3 and J4.

When the one detecting board replaces the second detecting board 20, the first group of data pins S1-S7 and the group power pins P1-P15 of the SAS female connector J1 are connected to the corresponding pins of the SAS male connector J2. Two data output pins S12 and S13 of the second group of data pins S8-S14 are respectively connected to the two SMA connectors J3 and J4.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A serial attached small computer system interface (SAS) interface output signal detecting apparatus, comprising:
    a detecting board comprising:
        an SAS female connector comprising a first group of data pins, a second group of data pins, and a group of power pins;
        an SAS male connector comprising a first group of data pins, a second group of data pins, and a group of power pins, wherein the group of power pins of the SAS female connector are connected to the group of power pins of the SAS male connector; and
        two subminiature version A (SMA) connectors;
        wherein two data output pins of the second group of data pins of the SAS female connector are respectively connected to the two SMA connectors in response to the first group of data pins of the SAS female connector being connected to the first group of data pins of the SAS male connector;
        wherein two data output pins of the first group of data pins of the SAS female connector are respectively connected to the two SMA connectors in response to the second group of data pins of the SAS female connector being connected to the second group of data pins of the SAS male connector.

2. The SAS interface output signal detecting apparatus of claim 1, wherein impedance of each of the SMA connectors is about 50 ohms.

3. A serial attached small computer system interface (SAS) interface output signal detecting apparatus, comprising:
    a first detecting board comprising:
        an SAS female connector comprising a first group of data pins, a second group of data pins, and a group of power pins;
        an SAS male connector comprising a first group of data pins, a second group of data pins, and a group of power pins, wherein the group of power pins of the SAS female connector are connected to the group of power pins of the SAS male connector, the first group of data pins of the SAS female connector are connected to the first group of data pins of the SAS male connector; and
        two subminiature version A (SMA) connectors connected to two data output pins of the second group of data pins of the SAS female connector; and
    a second detecting board comprising:
        an SAS female connector comprising a first group of data pins, a second group of data pins, and a group of power pins;
        an SAS male connector comprising a first group of data pins, a second group of data pins, and a group of power pins, wherein the group of power pins of the SAS female connector are connected to the group of power pins of the SAS male connector, the second group of data pins of the SAS female connector are connected to the second group of data pins of the SAS male connector; and
        two subminiature version A (SMA) connectors connected to two data output pins of the first group of data pins of the SAS female connector.

4. The SAS interface output signal detecting apparatus of claim 3, wherein impedance of each of the SMA connectors is about 50 ohms.

* * * * *